Aug. 22, 1933.   H. W. O'DOWD   1,923,639
LIQUID HEATING APPARATUS
Filed Jan. 24, 1930   2 Sheets-Sheet 1

Inventor;
Henry W. O'Dowd
by
Attorneys.

Aug. 22, 1933.  H. W. O'DOWD  1,923,639
LIQUID HEATING APPARATUS
Filed Jan. 24, 1930   2 Sheets-Sheet 2

Inventor
Henry W. O'Dowd
by
Attorneys

Patented Aug. 22, 1933

1,923,639

UNITED STATES PATENT OFFICE 1,923,639

LIQUID HEATING APPARATUS

Henry W. O'Dowd, Jersey City, N. J., assignor to Standard Gas Equipment Corporation, a Corporation of Maryland Application January 24, 1930. Serial No. 422,977

4 Claims. (Cl. 126—345)

This invention relates to liquid heating apparatus, and while capable of general application, refers more particularly to gas-fired apparatus.

An important feature of the invention is the provision of a heating apparatus with a liquid container or vessel having an extended heating surface exposed to the action of the heating element or gas burner, so as thereby to increase the heating efficiency of the apparatus.

Another feature is the provision of such a heating apparatus with internal and external heating chambers, which are in communication with each other, and which are heated from a common source of heat.

Another object is to provide such an apparatus, when a gas burner is employed as the heating element, with a novel arrangement of pilot light to facilitate the lighting of said burner.

Another object is to provide such an apparatus of extremely simple construction, and one which is adapted for a wide variety of uses.

The foregoing and other objects, features, and advantages of the invention will be apparent from the following description in connection with the accompanying drawings, wherein one form of the invention has been shown by way of illustration, and wherein Fig. 1 is a top plan view of one embodiment of the invention;

Figure 1:
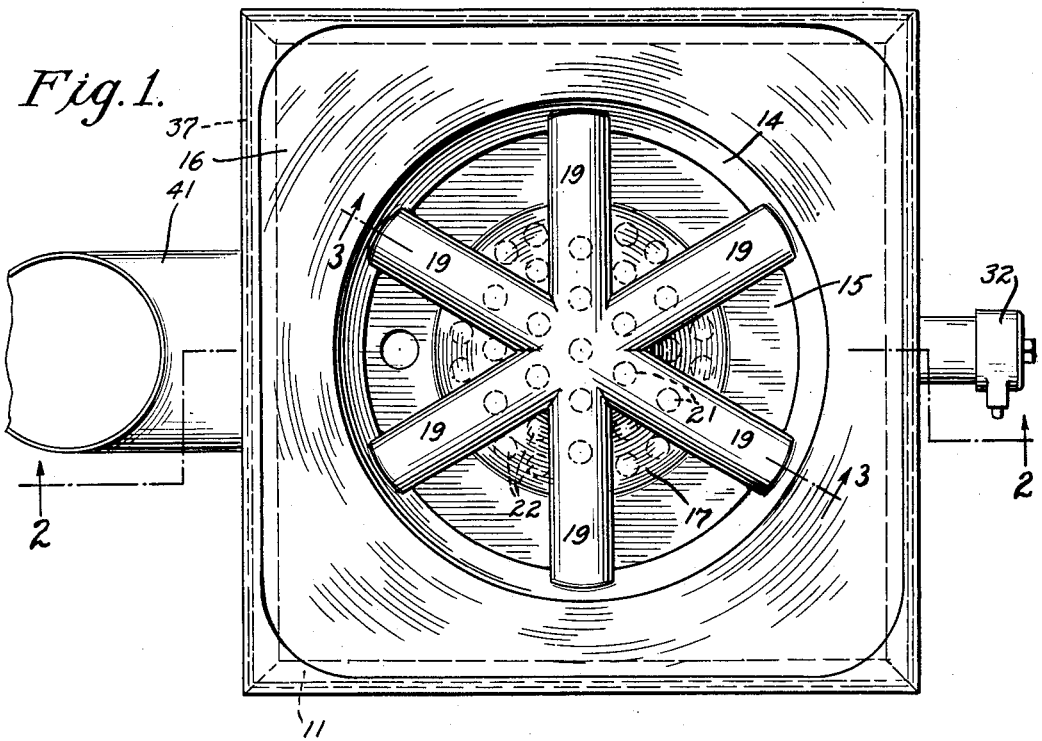
Figure 4:
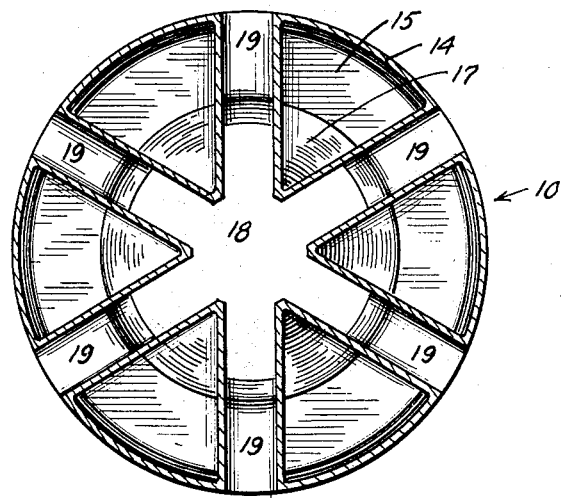
Fig. 4 is a horizontal sectional view taken on the line 4—4 of Fig. 3.

Referring to the drawings in detail, it will be seen that the heating apparatus therein illustrated comprises a vessel 10 for containing the liquid to be heated, a casing 11 surrounding said vessel, and a heating member 12, all assembled together into a complete, compact unit.

Figure 2:
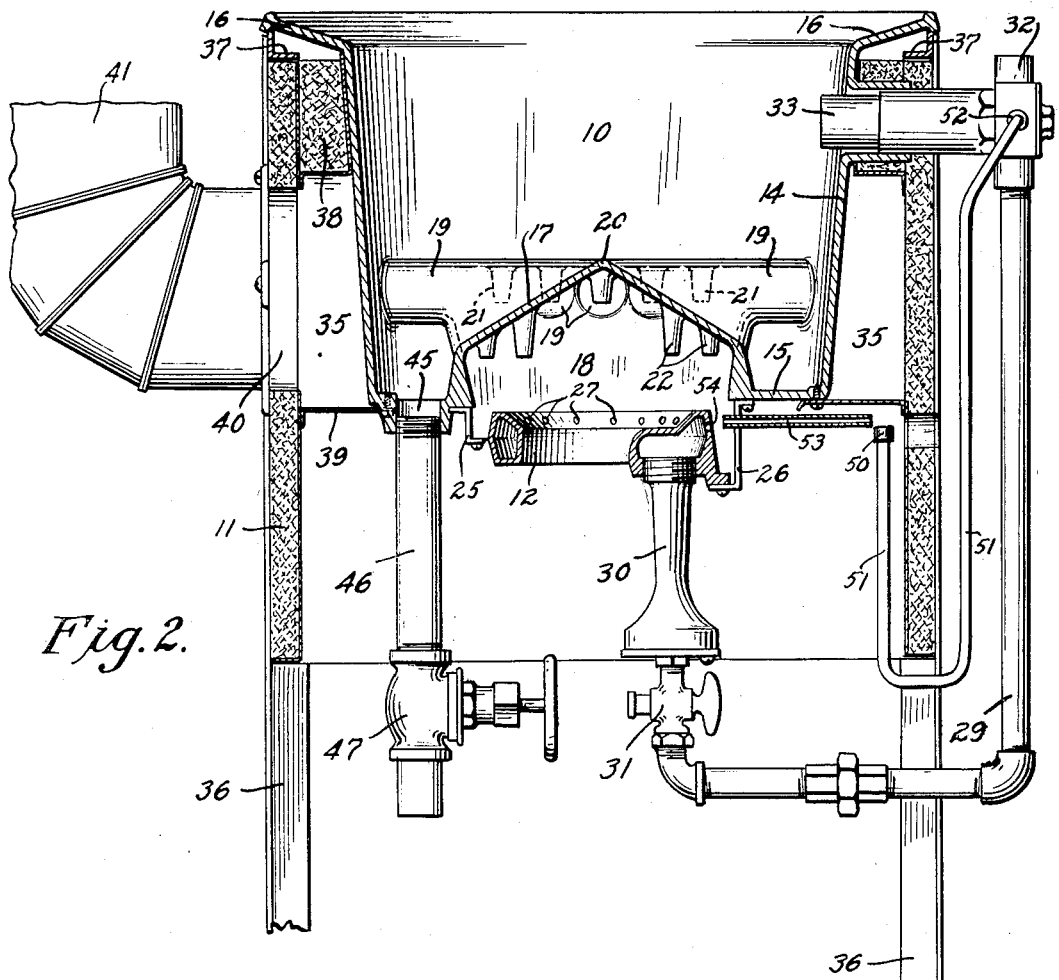
Fig. 2 is a vertical longitudinal sectional view taken on the line 2—2 of Fig. 1.
Figure 3:
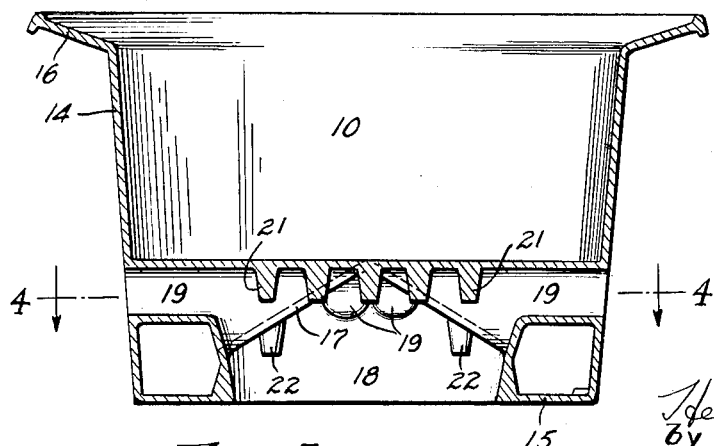
Fig. 3 is a fragmentary transverse sectional view taken on the line 3—3 of Fig. 1.

The vessel 10 is comparatively deep and is preferably formed as a single casting of iron, aluminum, or other suitable material, and comprises a substantially cylindrical side wall 14, a bottom wall 15, and if desired, an upper marginal rim or flange 16. For convenience in manufacture, the side wall 14 of the vessel is slightly tapered as shown in Figs. 2 and 3. The central portion 17 of the bottom 15 is raised or made in the form of an upright cone so as to increase the heating surface of the bottom of the vessel, this cone-shaped upward extension being open at its lower end or base and thus forming an internal central heating chamber or combustion chamber 18 in which the heating element or Bunsen burner 12 generates heat. Also arranged within the vessel 10 are several radially disposed tubular open-ended flues 19 (six in the present instance) intersecting the raised conical portion 17 at its center and extending through the side wall 14 of said vessel 10. These flues 19 not only provide additional heating surfaces within the vessel 10 but in addition provide passages through which hot gases may escape from the chamber 18 to the outer side of the vessel. Preferably, the flues 19 are circular in cross-section and have their upper sides substantially tangent with the apex 20 of the cone-shaped bottom 17.

In order to increase still further the area of the heating surfaces as well as to prevent the too rapid escape of the heat generated by the heating member 12, the flues 19 are internally provided with projections 21, and similarly the lower side of the cone-shaped bottom 17 is provided with projections 22 between the adjacent flues.

The heating member 12, in the illustrated embodiment of the invention, is in the form of an annular gas burner which is suitably supported by brackets 25 and 26 at the bottom of the vessel 10. As shown in Fig. 2, the gas burner 12 is formed with an annular series of obliquely disposed flame ports 27 which direct the flames upwardly and inwardly into the chamber 18 and against the inclined walls of the raised cone-shaped bottom 17 and its depending projections 21 and 22. Gas is supplied to the burner 12 through a pipe 29 and mixing tube 30, into which latter primary air is admitted in the usual way. Secondary air to support combustion at the flame ports is drawn as needed through the center of the burner and around the outside thereof. The pipe 29 is fitted at any suitable point in its length with a manually controlled cock or valve 31 by means of which the supply of gas may be turned on or off, as desired.

The pipe 29 is also provided with a thermostatically controlled valve 32, of any ordinary or preferred form, whereby the flow of gas to the burner 12 will be automatically controlled to maintain the liquid in the vessel 10 at any desired or predetermined temperature. This thermostatically controlled valve 32 includes a heat-responsive element 33 which extends through the casing 11 and side wall 14 of the vessel 10 at such a height as to be immersed in the heated liquid, and is capable of manual adjustment for the selective maintenance of different temperatures.

The casing 11 is formed of or lined with heat-insulating material such as asbestos, and is spaced from the side wall 14 of the vessel 10 so as to provide an outer heating chamber 35 which completely surrounds the vessel. The casing is supported by leg members 36, at its four corners, which preferably extend to the top of the casing where they are secured together by steel angle bars 37, the vertical flanges of which extend upwardly as shown in Fig. 2. In the illustrated embodiment, the vessel 10 is supported by its upper marginal flange 16 resting on said angle bars 37, but obviously it may be otherwise supported, as by brackets at the inside of the casing, upon which the bottom of the vessel can rest. The upper side of the outer heating chamber 35 is closed by a heat-insulating filler 38, while its lower side is closed by a horizontal plate 39 which is secured to the bottom wall 15 of the vessel 10 and to the inner sides of the casing 11.

The tubes or flues 19 open outwardly into the outer heating chamber 35 thus formed, and as a result, the hot gases, after passing through said flues, will circulate around the exterior of the vessel and give up additional heat units before escaping to the atmosphere. Heat losses by radiation are, of course, reduced to a minimum by the insulating nature of the casing. At one side, the casing 11 is formed with an outlet 40 from the chamber 35, for connection of an exhaust flue 41, which carries off the products of combustion.

In using the improved apparatus, the vessel 10 is filled with the liquid to be heated, to a height sufficient to cover the heat-responsive element 33, and the burner 12 is lighted. The flames from the burner, being directed inwardly and upwardly, apply their heat directly to the side walls of the raised cone-shaped bottom portion 17 as well as to the several flue tubes 19. In view of the large area of the heating surfaces presented by these parts, and by virtue of the conduction and distribution of the heat caused by the projections 21 and 22, the liquid will be rapidly heated to the desired temperature, and it will be maintained at that temperature by the action of the thermostatic valve 32 which regulates the flow of gas to the burners. The products of combustion then pass outwardly through the radially disposed tubes 19 and into and around the outer heating chamber 35, and in doing so they give up more of their heat to the entire body of the liquid, both from within and without. The convection currents set up in the liquid by this application of the heat insures a practically uniform temperature throughout the body of the liquid, a condition which is particularly desirable for some purposes and which has not been attainable with prior art heaters. As previously stated, the exhaust gases are carried off by the flue 41 after circulating through the outer heating chamber 35. Thus the heating is effected very rapidly and with the use of a minimum quantity of fuel.

For the purpose of withdrawing the liquid from the vessel when desired, the bottom wall 15 is provided at one side with a drain opening 45 located between the side wall 14 and the raised bottom 17. A drain pipe 46 is connected with said opening 45, and is fitted with a manually operable valve 47 for opening and closing the drain.

The invention has many industrial and domestic uses. For example it may be employed in hospitals, barber shops, restaurants, etc., for sterilizing cups, glasses, and surgical instruments of all kinds, in which case the vessel will be filled with water or a liquid disinfectant which will be boiled, and into which the articles to be sterilized will be lowered in a basket or mesh frame. In this use, the tubes 19 serve the additional useful purpose of supporting the basket or mesh frame so that it need not be suspended from its upper edge. Similarly, the apparatus is adapted for use in preserving and canning various articles of food, particularly in what is known as the "cold-pack method". It can also be used for frying foods in deep fat, in which case the vessel 10 is filled with the melted fat or oil, and the foods immersed in it by the aid of a basket. It may be used with equal advantage as a glue pot, pitch kettle, oil purifier, or for innumerable other purposes in many different manufacturing processes where rapid, uniform and efficient heating is necessary.

As will be observed from Fig. 2, the lower portion of the apparatus is open, giving ready access to the burner 12 and to the drain valve 47, and insuring a plentiful supply of air to support complete combustion of the gas. This is an extremely important feature of the invention inasmuch as it precludes the generation of carbon monoxide, the dangers of which are well known.

While the burner 12 may be lighted in any desired manner, a pilot light 50 is preferably employed for the purpose. This pilot light 50 comprises an apertured tip on the end of a small gas tube 51 and is arranged within and close to one side of the casing 11, substantially at the level of the top of the burner 12. The other end of the gas tube 51 is connected to the main gas supply pipe or manifold 52 so that the pilot light will be constantly supplied with gas irrespective of the thermostatically operated valve 32. A lighting tube 53 is supported horizontally below the vessel 10, with one of its ends adjacent to the flame of the pilot light, and its other end adjacent to one side of the burner 12, at which latter point the burner is provided with a special flame port 54 which is so disposed as to direct issuing gas into the lighting tube 53. Consequently, as the gas supply is turned "on" preliminary to using the heater, the gas from the port 54 will pass through the tube 53 till it comes in contact with the flame of the pilot light 50, whereupon the gas becomes ignited and carries the flame back to the gas which is issuing from the flame ports 27. In this way, the burner 12 can be quickly lighted automatically, and moreover as long as the pilot light is burning, there is no likelihood of unburned gas escaping from the main burner. This feature is important not only because it facilitates lighting, but also because it promotes safety in the installation of the heater. An opening 55 is formed in the casing 11 at a point substantially in line with the pilot light, said opening giving access for lighting the pilot with a match or taper, as will be obvious.

From the foregoing it will be evident that an improved liquid heating apparatus has been provided of extremely simple construction, and one which will operate with maximum efficiency. The invention is, of course, susceptible of numerous modifications in the details of construction and arrangement of parts, and the right is herein reserved to make such changes as fall within the scope of the appended claims without departing from the spirit of the invention.

Having thus described my invention, what I claim is:

1. A deep fat frying apparatus comprising a substantially cylindrical open top vessel for containing a liquid cooking medium, said vessel having a raised conical bottom portion forming a heating chamber, the wall of the vessel and the wall of the raised conical bottom portion forming therebetween with the bottom of the vessel a sediment chamber, a plurality of open-ended heat-distributing flues disposed radially within the vessel and having their open ends passing through the side walls of the vessel and through said raised conical bottom portion, and a gas burner for generating heat within said conical bottom portion, the heat-distributing flues being substantially circular in cross section and having their upper sides substantially flush with the apex of the conical bottom of the vessel and their lower sides located substantially above the bottom of the vessel, whereby a heated cooking zone will be established above said heating chamber and a cooler zone be established within the sediment chamber.

2. A deep fat frying apparatus comprising a vessel for containing a liquid cooking medium, said vessel having a heating chamber in the bottom thereof, the wall of the vessel and the wall of the heating chamber forming therebetween with the bottom of the vessel a sediment chamber, a plurality of open ended heat distributing flues disposed radially within the vessel and having their open ends passing through the side walls of the vessel and of the heating chamber, and means for supplying heat to said heating chamber, the heat distributing flues being substantially circular in cross section and having their upper sides substantially flush with the top of the heating chamber and their lower sides located substantially above the bottom of the vessel, whereby a heated cooking zone will be established above said heating chamber and a cooler zone be established within the sediment chamber.

3. A deep fat frying apparatus comprising a vessel for containing a liquid cooking medium, means forming a heating chamber in the bottom thereof, said vessel being adapted to contain above said heating chamber a meshed receptacle for the food to be fried, the wall of the vessel and the wall of the heating chamber forming therebetween with the bottom of the vessel a sediment chamber, a plurality of open ended heat distributing flues disposed radially within the vessel and having their open ends passing through the side walls of the vessel and of the heating chamber, means for supplying heat to said heating chamber, the heat distributing flues being substantially circular in cross section and having their upper sides substantially flush with the top of the heating chamber and their lower sides located substantially above the bottom of the vessel, whereby a heated cooking zone will be established above said heating chamber and a cooler zone be established within the sediment chamber, and the parts of the apparatus being so constructed and arranged that particles of food dropping from the food receptacle will descend into the sediment chamber.

4. A deep fat frying apparatus comprising a vessel for containing a liquid medium, means forming a heating chamber in the bottom thereof, said vessel being adapted to contain above said heating chamber a meshed receptacle for the food to be fried, the wall of the vessel and the wall of the heating chamber forming therebetween with the bottom of the vessel a sediment chamber, a plurality of open ended heat distributing flues disposed radially within the vessel and having their open ends passing through the side walls of the vessel and of the heating chamber, means for supplying heat to said heating chamber, the heat distributing flues being substantially circular in cross section and having their upper sides substantially flush with the top of the heating chamber and their lower sides located substantially above the bottom of the vessel, whereby a heated cooking zone will be established above said heating chamber and a cooler zone be established within the sediment chamber, and the parts of the apparatus being so constructed and arranged that particles of food dropping from the food receptacle will descend into the sediment chamber, and a drain leading from the floor of said sediment chamber.

HENRY W. O'DOWD.